Patented Feb. 8, 1949

2,461,334

UNITED STATES PATENT OFFICE 2,461,334

LIQUID TREATING UNIT

Ralph M. Major, Evansville, Ind., assignor to Servel, Inc., New York, N. Y., a corporation of Delaware Application December 1, 1944, Serial No. 566,087

7 Claims. (Cl. 210—17)

This invention relates to dispensing of small measured quantities of liquid, and more particularly to dispensing small measured quantities of a chemical to make-up water in a water cooling tower.

This application relates back for common subject matter to earlier application Serial No. 463,169 filed October 24, 1942, now abandoned.

In the operation of a water cooling tower, it is often necessary to treat the water by the addition of a purifying chemical to destroy organic growths of the algae and fungi types, and to remove scale-forming constituents of the water, such as calcium and magnesium bicarbonates.

Some chemical liquids usually used are corrosive and most are highly concentrated and, therefore, must be added in accurate proportions to the amount of water being treated. In the particular case of hydrochloric acid treatment in a spray type water cooling tower, for example, about twenty-five gallons of water per hour may need treatment of only one cubic centimeter of acid per gallon of water.

In the operation of a water cooling tower, make-up water must be added from time to time in order to take care of losses due to evaporation, leakage and the like, and it is an object of this invention to treat this make-up water with small quantities of a chemical as the water is being added to the system.

It is a further object of this invention to utilize the flow of the liquid being treated to accurately measure and deliver given quantities of a chemical to this liquid.

My invention, together with its objects and advantages, is more fully set forth in the following description and accompanying drawings, wherein Figs. 1 and 2 each more or less diagrammatically illustrates a form of apparatus embodying my invention.

Figure 1:
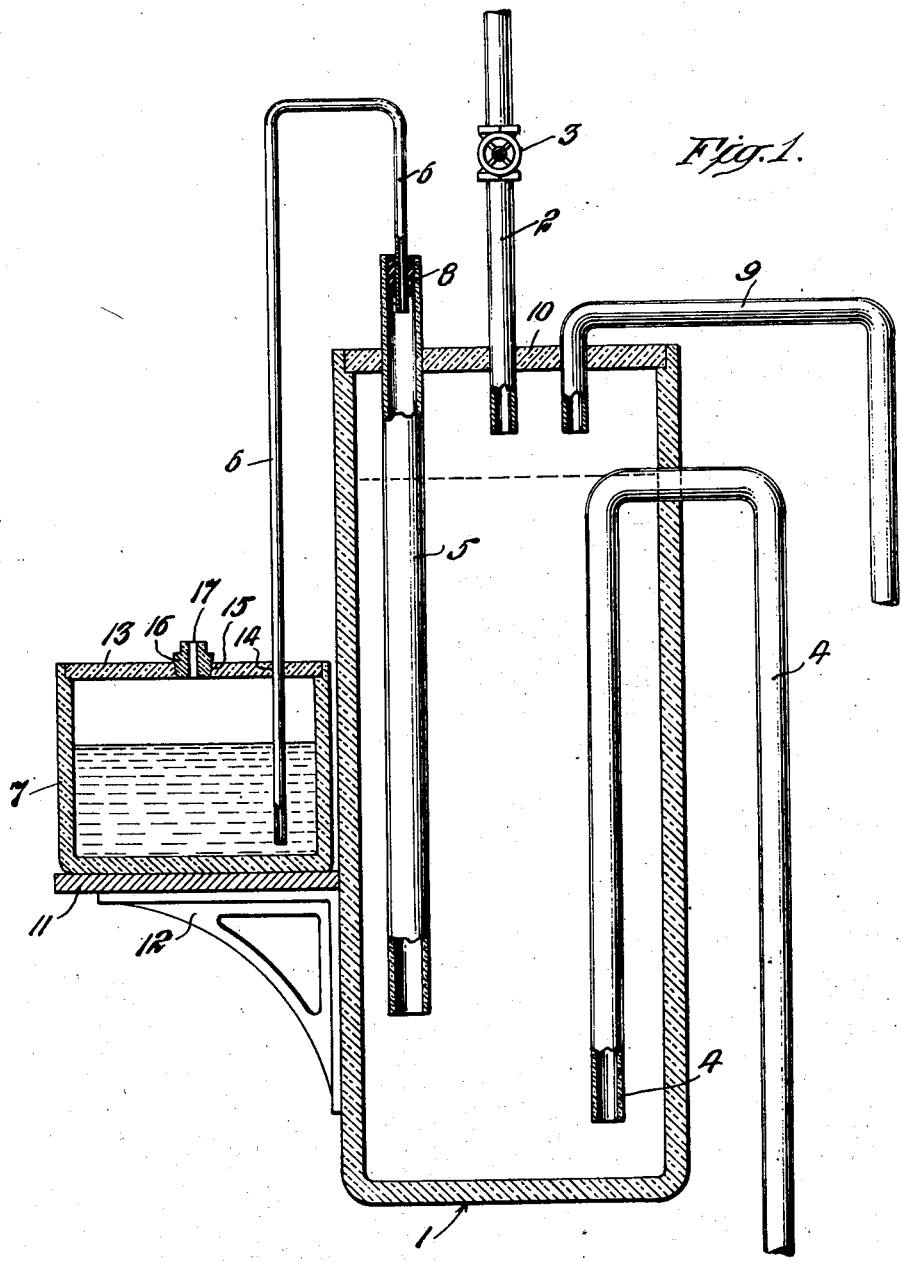

Referring to Fig. 1 of the drawing, there is disclosed a receptacle 1 adapted to receive make-up water from a conduit 2, which in turn is connected, for instance, to a city main and is provided with a suitable control valve 3. A siphon tube 4 opens into the lower part of receptacle 1 and is adapted to intermittently and automatically siphon the contents of the receptacle into, for example, the sump of a water cooling tower (not shown). A suction tube 5 leads from the lower portion of receptacle 1 and is connected at its upper end with a capillary tube 6, which in turn opens into a chemical reservoir 7. The connection between suction tube 5 and capillary tube 6 is made air-tight as by means of a rubber sleeve 8. Suction tube 5 is mounted in receptacle 1 in such manner that the height of the lower or outlet end of said tube relative to the inlet end of siphon tube 4 may be adjusted. However, the outlet end of suction tube 5 must always be higher than the inlet end of siphon tube 4. The upper portion of receptacle 1 is provided with a safety overflow conduit 9 which functions to prevent flow of make-up water into reservoir 7 in case siphon tube 4 fails to operate. This overflow conduit also acts as a vent for receptacle 1. Receptacle 1 is equipped with a cover 10 provided with openings which receive inlet conduit 2, suction tube 5, and overflow conduit 9.

Capillary tube 6, which is an important feature of my invention, is of a definite internal diameter and a definite length. It has been found in practice that when used for dispensing hydrochloric acid into make-up water for a cooling tower, for example, that this capillary tube should have an internal diameter of the order of one thirty-second of an inch or less. This internal diameter, which is to be taken as illustrative and not as a limitation, affords a manner of determining the amount of chemical that is dispensed into the make-up water, to be described more in detail hereinafter. It has been found in practice that the flow resistance of the capillary tube is such a large factor relative to other hydrostatic conditions, such as the hydrostatic head due to the level of liquid in the chemical reservoir, that the effects of the latter are negligible. The term "capillary" as applied to the tube 6 is not intended to be used in a limiting sense; this tube may well be termed a restricted tube in that it acts as a restrictor and it has restricted uniform diameter throughout its length.

Chemical reservoir 7 is supported on container 1 in any suitable manner as by a shelf 11 and a pair of brackets 12, only one of which brackets is shown. Reservoir 7 is provided with a removable cover 13. The cover 13 is provided with an opening 14, which loosely receives capillary tube 6, and with a filling opening 15 closed by a removable plug 16 having a vent opening 17 extending therethrough. The vent 17 may be connected to an exhaust flue, not shown, or other usual conduit for properly disposing of waste gas if the installation is indoors. The parts of the apparatus which may be exposed to the concentrated chemical, such as receptacle 1, siphon tube 4, suction tube 5, capillary tube 6, and chemical reservoir 7, should be made of corrosion-resisting material as glass, hard rubber, stoneware, or the like.

In operation, when make-up water is supplied through conduit 2 to receptacle 1, the water level rises in the receptacle until the level reaches the top of siphon tube 4, at which time the water is automatically siphoned from the receptacle at a faster rate than it is supplied thereto. In this manner, receptacle 1 is alternately filled and emptied. During the filling of receptacle 1, as the water level rises therein, a piston-like column of water is formed in suction tube 5 which, as it rises, compresses and forces air from said suction tube through capillary tube 6 into and through the liquid chemical in reservoir 7 and through vent opening 17 into the atmosphere. It will be seen that by this arrangement any liquid chemical that may have remained in capillary tube 6 after the preceding emptying of receptacle 1 will be forced back into reservoir 7. Now, when the level of the make-up water in receptacle 1 reaches the top of the siphon tube 4, the receptacle is emptied, as stated above, and as the water level is lowered in said receptacle the piston-like column of water that has been formed in suction tube 5 is also lowered. It has been found in practice that during the emptying of receptacle 1 the water level in said receptacle is lowered much faster than the piston-like column of water is lowered in suction tube 5. This is due to the fact that, as the piston-like column of water is lowered in the suction tube, it draws or sucks liquid chemical from reservoir 7 into the bottom of capillary tube 6 and up through said capillary tube into the suction tube, and since the resistance to flow of the chemical through the capillary tube is relatively high, a partial vacuum is created above the falling column of water in the suction tube.

In practice, the internal diameter and length of capillary tube 6 is so chosen that this tube delivers a desired number of drops of chemical into suction tube 5 when receptacle 1 is emptied in a certain time. With a given capillary tube 6, the number of drops varies directly with the emptying time. This may be explained as follows: If valve 3 in supply conduit 2 is set or operated so that make-up water flows into receptacle 1 at a certain slow rate, once the level of the water reaches the top of siphon tube 4, the siphon tube will lower the water level in said receptacle to the bottom of suction tube 5 in a certain short period of time and, due to the resistance that capillary tube 6 offers to the flow of chemical therethrough, a certain number of drops of chemical will be drawn into suction tube 5 by the falling column of water therein before the top of said column of water reaches the bottom of said suction tube, at which time the flow through the capillary tube and into the suction tube ceases. If, on the other hand, the rate of flow of make-up water into receptacle 1 is increased, the emptying of said receptacle through siphon tube 4 is slower; that is, the level of water in receptacle 1 falls at a slower rate. Likewise, the column of water in suction tube 5 lowers at a slower rate and the suction which causes flow of the chemical through capillary tube 6 is exerted during a longer period of time, resulting in a greater number of drops of chemical being drawn into the suction tube before the top of the column of water reaches the bottom of said tube.

Therefore, it is seen that when make-up water flows into receptacle 1 at a relatively fast rate, a relatively large number of drops of chemical are delivered to said make-up water; and that when make-up water flows into said receptacle at a relatively slow rate, a relatively small number of drops of chemical are delivered to said make-up water. In other words, for a given size capillary tube, the quantity of chemical delivered to the make-up water per unit volume of water is substantially the same whether the make-up water flows into the receptacle 1 at a fast or at a slow rate.

Figure 2:
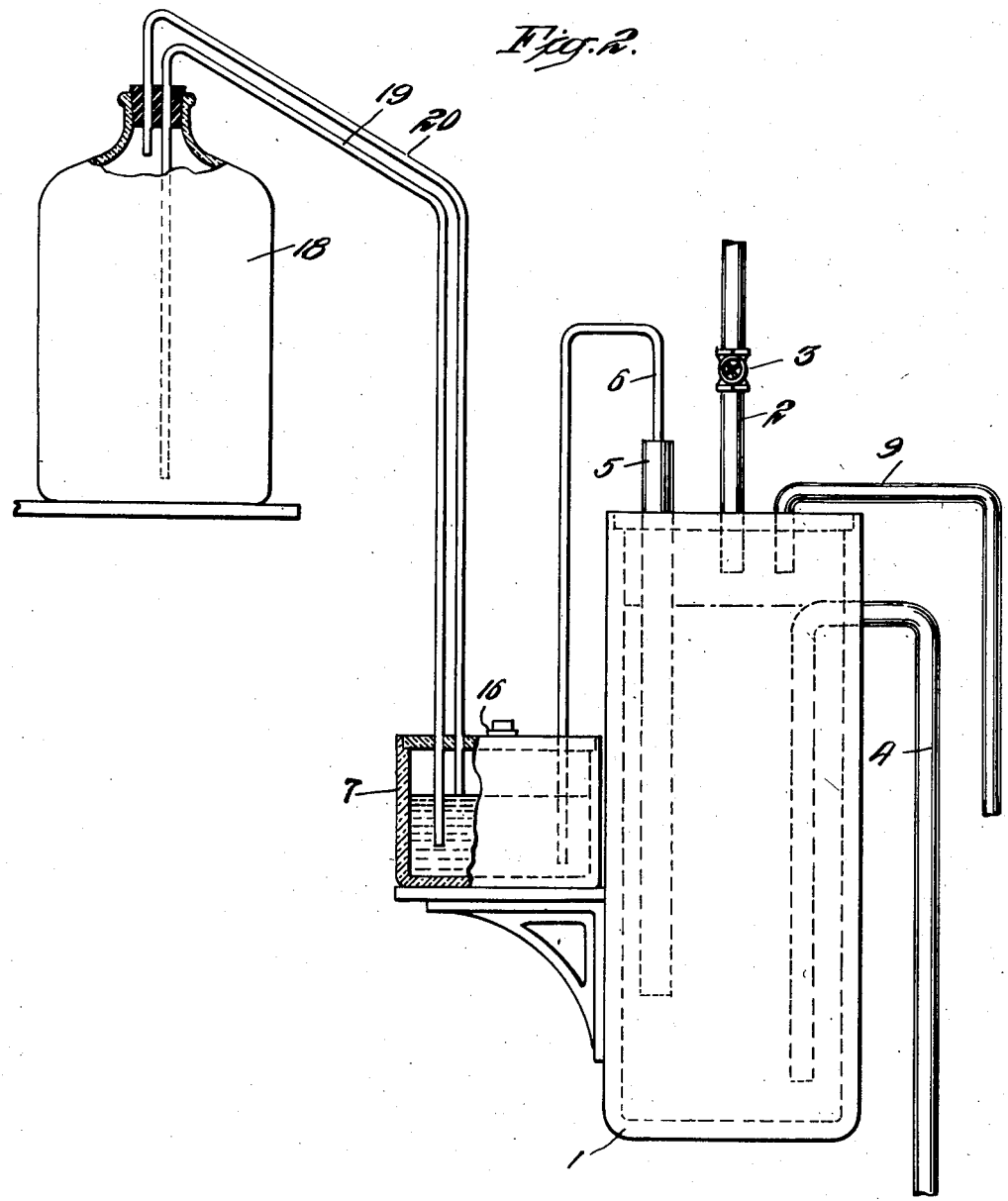

Referring to Fig. 2 of the drawing, there is disclosed a liquid dispensing apparatus that is substantially identical with the disclosure of Fig. 1 with the exception that in this second embodiment means are provided for feeding liquid chemical into the chemical reservoir 7 from a portable container. This means includes a chemical carboy 18 detachably connected to chemical reservoir 7 by means of two tubes 19 and 20. Tube 19, which is a siphon tube, extends from the bottom of carboy 18 into the lower portion of chemical reservoir 7. Tube 20 is a vent tube which extends from the upper portion of carboy 18 into the upper portion of chemical reservoir 7. The depth to which tube 20 extends into reservoir 7 determines the level of the chemical in said reservoir. As stated above, the effects of the hydrostatic head due to the level of liquid in the chemical reservoir are negligible. However, with this constant level arrangement, even this small deviation is eliminated. Also, with this arrangement, chemical reservoir 7 may be of a certain convenient size and be connected to commercial chemical carboys of varying sizes. In the drawing, capillary tube 6 and tubes 19 and 20 are shown as being substantially the same size. However, in practice, tubes 19 and 20 are much larger in internal diameter than capillary tube 6. The operation of this second embodiment of my invention is the same as the embodiment illustrated in Fig. 1 except that as liquid chemical is drawn from reservoir 7 into capillary tube 6, and the level of the chemical in said reservoir lowers, air flows through tube 20 into carboy 18 displacing chemical therefrom, which chemical flows through tube 19 into reservoir 7. This flow continues until the liquid level in reservoir 7 reaches the lower end of tube 20 at which time the flow stops.

In calibrating my improved liquid treating device, it is necessary to determine the normal amount of make-up water that is to be added to a particular body of water in a given period of time; then it is necessary to determine the normal amount of chemical that is to be added to the make-up water per unit volume in order to retain the body of water in a particular condition; then a capillary tube of given internal diameter and length is selected which will dispense the desired amount of chemical into a unit volume of the make-up water. Now, if the normal amount of make-up water to be added to the body of water is increased or decreased, as by operation of the inlet valve 3, the amount of chemical delivered to the make-up water per unit volume of said water remains substantially constant. If, however, it is desired to adjust the amount of chemical delivered to the make-up water per unit volume thereof, the immersion depth of suction tube 5 would be changed, or a capillary tube of different internal diameter and/or length would be used. Also, if a liquid of different viscosity is to be added to the make-up water, a different size capillary tube and/or a different immersion depth of suction tube 5 would be selected.

While I have illustrated and described two embodiments of my invention, it obviously may take other forms and be variously applied within the scope of the following claims.

What I claim is:

1. A device for adding a measured quantity of a second liquid to a first liquid comprising a receptacle adapted to receive said first liquid, an inlet conduit for flow of said first liquid into said receptacle, a siphon tube for intermittently emptying said receptacle, a reservoir for a second liquid open to the atmosphere, a conduit extending into said receptacle well below the top of said siphon tube and terminating above the inlet of said siphon tube in open communication with said receptacle, a capillary tube connected to one end of said conduit and having its opposite end submerged in liquid in said reservoir.

2. A liquid-treating unit comprising a liquid receptacle, a conduit for supplying liquid to said receptacle, a second conduit for intermittently emptying said receptacle, a reservoir for a second liquid, a pump connected between said liquid receptacle and said reservoir, said pump comprising a hollow cylindrical member with one end opening into said liquid receptacle well below the maximum liquid level therein and a capillary tube connected at one end to the opposite end of said cylindrical member and having its opposite end submerged in liquid in said reservoir, and means for venting said liquid receptacle and said reservoir.

3. A liquid-treating apparatus comprising a conduit for the passage of liquid to be treated, a receptacle to receive said liquid, a reagent reservoir, a fluid connection between said receptacle and said reservoir, said fluid connection comprising a relatively long tubular member in said receptacle with one end opening into the lower portion of said receptacle and a capillary tube having one end connected to the opposite end of said long tubular member and having its opposite end submerged in liquid in said reservoir, and a siphon tube opening into said receptacle below the opening of said tubular member for intermittently discharging liquid from said receptacle.

4. A liquid-treating unit comprising a receptacle for liquid to be treated, a supply conduit for delivering liquid to said receptacle, a reservoir for a treating liquid, a fluid connection between said reservoir and said receptacle, said fluid connection comprising a relatively long tubular member connected to said receptacle and having one end opening into the lower portion thereof and a capillary tube connected to the opposite end of said tubular member and having its opposite end submerged in liquid in said reservoir, and means for intermittently gradually emptying said receptacle.

5. A liquid-treating apparatus having, in combination, a first receptacle for receiving liquid to be treated, a liquid supply pipe leading into said receptacle, a siphon tube leading from the lower portion of said receptacle for intermittently emptying said receptacle after liquid has reached a predetermined level therein, a second receptacle adapted to contain a second liquid, a conduit connected between said receptacles for flow of said second liquid from said second receptacle into said first receptacle, said conduit comprising a relatively long tubular member having one end opening into said first receptacle well below the predetermined level of liquid therein and a second tubular member of restricted but substantially uniform diameter connected at one end to said long tubular member and having its opposite end opening into said second receptacle below the level of liquid therein.

6. A device of the character described comprising a liquid receptacle, an inlet conduit conveying a first liquid into said receptacle, an outlet conduit opening into the lower portion of said receptacle for automatically discharging said first liquid from said receptacle after the said liquid has reached a certain predetermined level therein, a reservoir for a second liquid, a pump connected between said receptacle and said reservoir, said pump comprising a hollow cylindrical member having one end opening into said receptacle well below the predetermined liquid level, but above the opening of said outlet conduit and a capillary tube connected at one end to said hollow cylindrical member and having its opposite end opening into the lower portion of said reservoir.

7. A unit for treating flowing liquid comprising a reservoir adapted to hold a quantity of treating fluid, a suction chamber, a conduit connecting said reservoir from below the surface level of treating fluid therein to the upper part of said suction chamber and providing the only path for flow of treating fluid, said conduit including a riser extending above said surface level, and apparatus associated with said suction chamber for raising and lowering the level therein of liquid to be treated, said apparatus including means adapted to conduct the liquid to be treated to said suction chamber and an intermittent flow device for conducting the liquid therefrom.

RALPH M. MAJOR.

REFERENCES CITED

The following references are of record in the file of this patent:

UNITED STATES PATENTS

| Number | Name | Date |
| --- | --- | --- |
| 831,059 | Greth | Sept. 18, 1906 |
| 997,318 | Newman | July 11, 1911 |
| 1,150,673 | Greth et al. | Aug. 17, 1915 |
| 1,577,157 | Averill | Mar. 16, 1926 |
| 1,745,141 | Baker | Jan. 28, 1930 |
| 1,883,139 | Walter | Oct. 18, 1932 |
| 1,989,380 | Romans | Jan. 29, 1935 |

FOREIGN PATENTS

| Number | Country | Date |
| --- | --- | --- |
| 87,001 | Sweden | Aug. 4, 1936 |